United States Patent [19]
Green

[11] Patent Number: 5,743,701
[45] Date of Patent: Apr. 28, 1998

[54] ROLL ON ROLL OFF DEVICE WITH A PORTABLE SUPPORT

[76] Inventor: Richard Green, P.O. Box 249, Titus, Ala. 36080

[21] Appl. No.: 761,442

[22] Filed: Dec. 6, 1996

Related U.S. Application Data

[60] Division of Ser. No. 200,958, Feb. 24, 1994, Pat. No. 5,593,272, which is a continuation-in-part of Ser. No. 1,960, Jan. 8, 1993, Pat. No. 5,490,753.

[51] Int. Cl.$^6$ .................. B60P 3/42; B65G 67/02
[52] U.S. Cl. ............... 414/498; 296/164; 296/167
[58] Field of Search ................. 414/498; 296/164, 296/167, 37.6; 254/6 R, 6 C; 224/280

[56] References Cited

U.S. PATENT DOCUMENTS

| | | |
|---|---|---|
| 1,996,523 | 4/1935 | Pfeifer et al. . |
| 2,301,639 | 11/1942 | Onstott .................. 414/498 |
| 2,379,094 | 6/1945 | Maxon . |
| 2,523,749 | 9/1950 | Wilson . |
| 2,650,731 | 9/1953 | Adler . |
| 2,995,397 | 8/1961 | Eames .................. 296/164 |
| 3,077,278 | 2/1963 | Alexander . |
| 3,145,008 | 8/1964 | Herpick et al. ............ 414/498 X |
| 3,289,868 | 12/1966 | Miller et al. ............ 414/498 X |
| 3,471,045 | 10/1969 | Panciocco . |
| 3,521,902 | 7/1970 | Akers .................. 414/498 X |
| 3,612,315 | 10/1971 | Blackburn ............. 414/498 X |
| 3,655,234 | 4/1972 | Kirschbaum ........... 414/498 X |
| 3,695,471 | 10/1972 | River, Jr. ............... 414/498 |
| 3,722,721 | 3/1973 | Bennett ................. 414/498 |
| 3,883,020 | 5/1975 | Dehn .................... 414/498 |
| 3,901,304 | 8/1975 | Jacobsen . |
| 3,931,895 | 1/1976 | Grimaldo . |
| 3,958,707 | 5/1976 | Deppe . |
| 3,987,919 | 10/1976 | Weeks et al. . |
| 4,024,592 | 5/1977 | Schlagenhauf ........... 296/164 X |
| 4,053,072 | 10/1977 | Ross et al. ............. 414/498 X |
| 4,084,714 | 4/1978 | Williams ................ 414/498 |
| 4,114,854 | 9/1978 | Clark . |
| 4,147,267 | 4/1979 | Mai .................... 414/498 |
| 4,268,083 | 5/1981 | Carpenter .............. 296/35.3 X |
| 4,305,695 | 12/1981 | Zachrich . |
| 4,375,306 | 3/1983 | Linder . |
| 4,489,977 | 12/1984 | Earing, Jr. . |
| 4,681,360 | 7/1987 | Peters et al. . |
| 4,685,857 | 8/1987 | Goeser et al. . |
| 4,697,974 | 10/1987 | Eltoukhy . |
| 4,810,158 | 3/1989 | Bitzer .................. 414/498 |
| 4,824,158 | 4/1989 | Peters et al. . |
| 4,930,799 | 6/1990 | Pihlström et al. . |
| 4,979,865 | 12/1990 | Strickland . |
| 5,028,198 | 7/1991 | Buhr ................... 414/542 |
| 5,169,194 | 12/1992 | Yamashita et al. ........ 414/498 X |
| 5,224,812 | 7/1993 | Oslin et al. . |
| 5,490,753 | 2/1996 | Green ................... 414/498 |
| 5,593,272 | 1/1997 | Green ................... 414/498 |
| 5,662,450 | 9/1997 | Roberts ................. 414/498 X |

FOREIGN PATENT DOCUMENTS

| | | | |
|---|---|---|---|
| 944409 | 3/1974 | Canada .................. 296/167 |
| 274918A | 7/1988 | European Pat. Off. ...... 414/498 |
| 446388A | 9/1991 | European Pat. Off. ...... 414/498 |
| 1183846 | 4/1959 | France .................. 414/498 |
| 2686843-A1 | 8/1993 | France . |
| 94/11218 | 5/1994 | WIPO ................... 414/498 |

Primary Examiner—Stephen Gordon
Attorney, Agent, or Firm—Brinks Hofer Gilson & Lione

[57] ABSTRACT

A roll on roll off receptacle handling system, that can load and unload a receptacle, store the receptacle and transporting the receptacle. The system includes a storage platform or independent support, such as portable jacks, for supporting the receptacle when it is rolled off the transport device. The transport device, that the receptacle can be rolled on to, can transport the receptacle to another location where it can be rolled off to another platform or independent support. The system also includes power assist devices for operating the jacks and for moving the receptacles to and from the transport device.

5 Claims, 12 Drawing Sheets

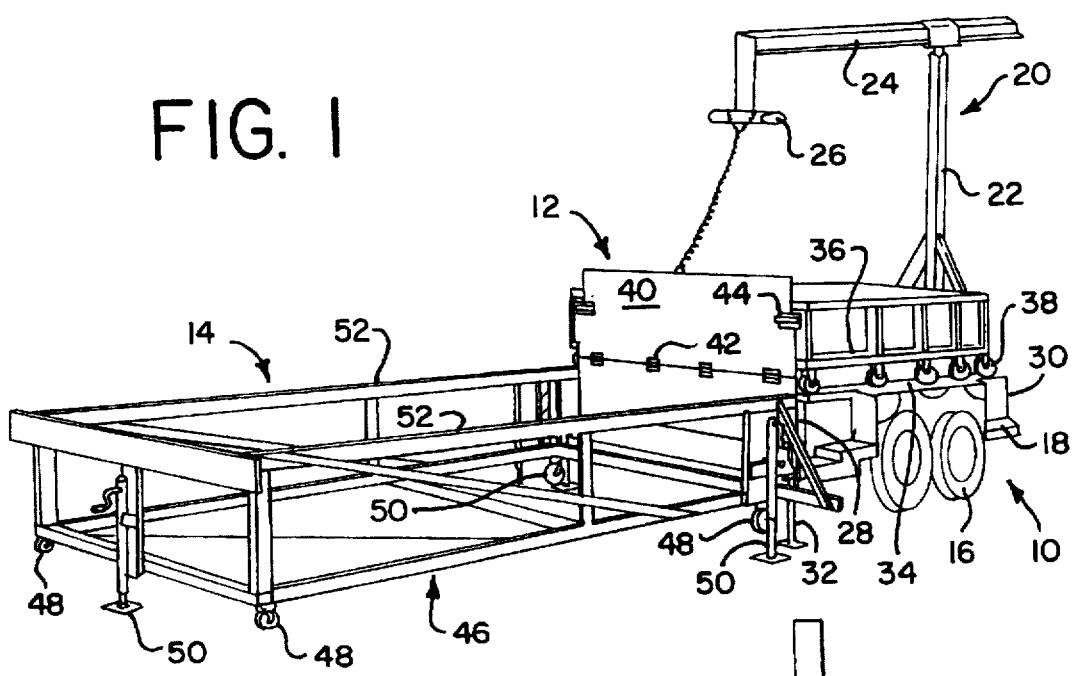
FIG. 1
FIG. 2
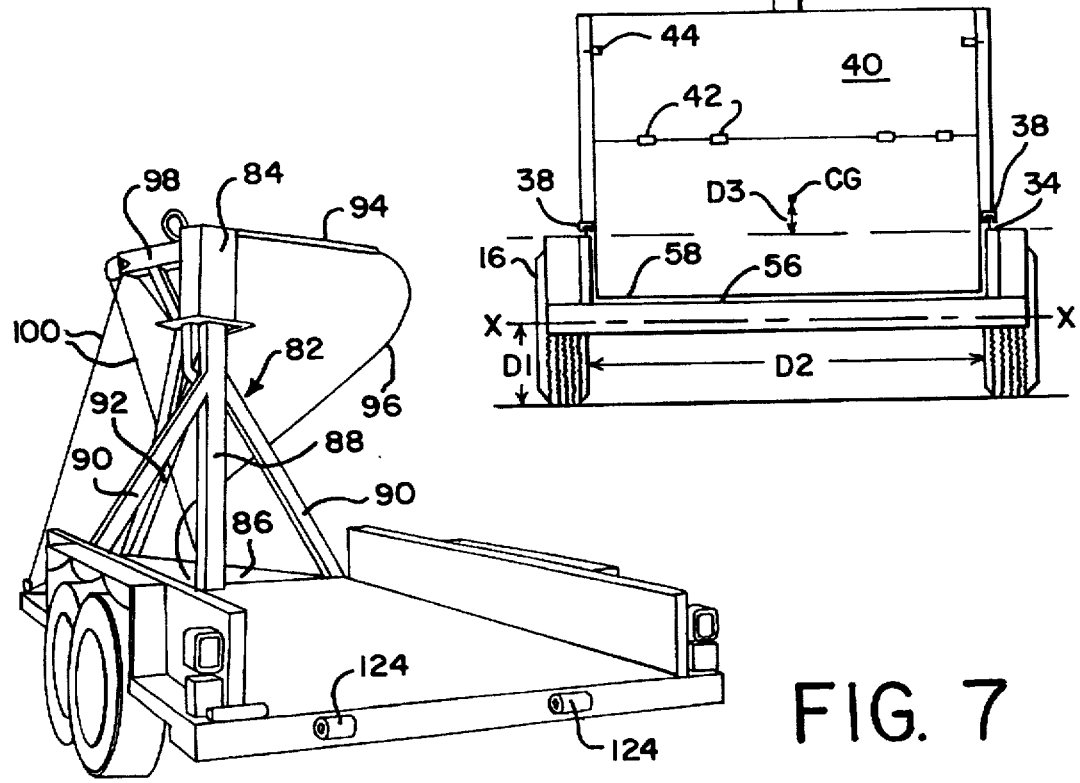
FIG. 7

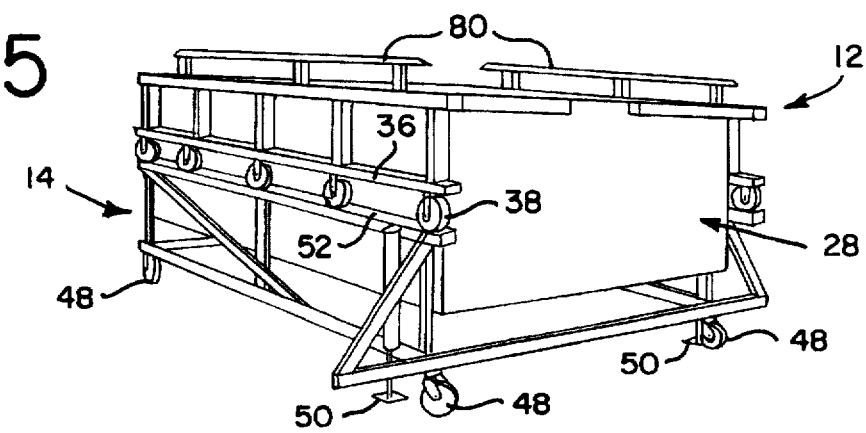
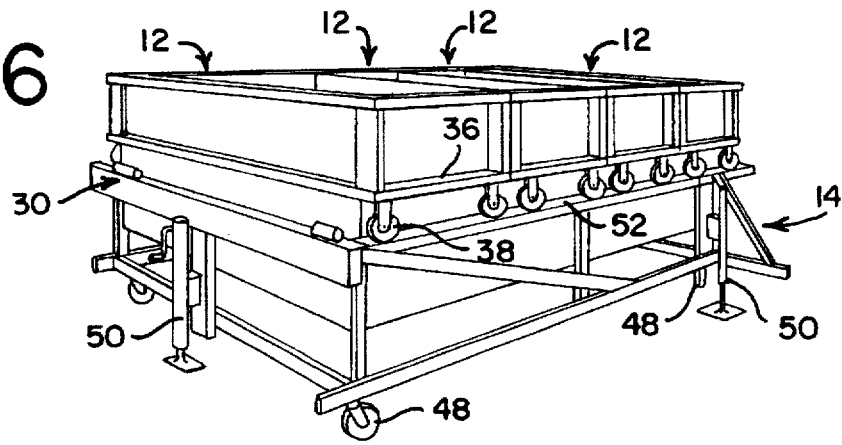
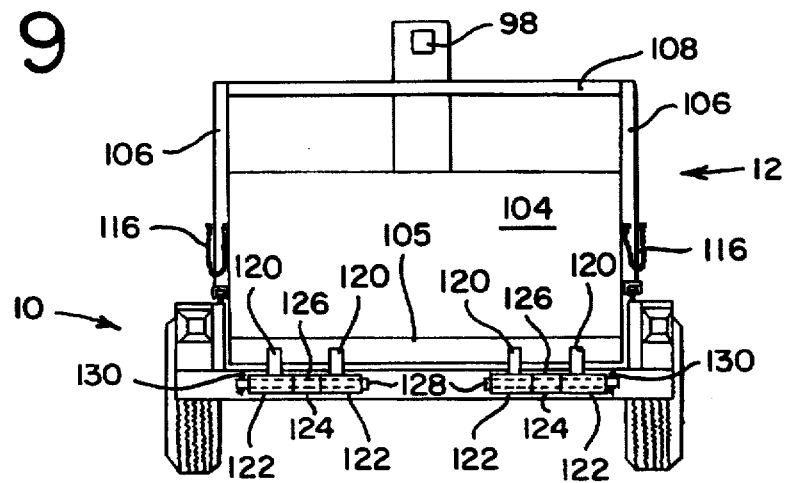

ROLL ON ROLL OFF DEVICE WITH A PORTABLE SUPPORT

CROSS-REFERENCES

The present application is a division of U.S. Pat No. 5,593,272 that issued on Jan. 14, 197 from application Ser. No. 08/200,958, filed Feb. 24, 1994 which is a continuation in part of U.S. Pat. No. 5,490,753 that issued on Feb. 13, 1996.

BACKGROUND OF THE INVENTION

There are considerable costs expended in packaging, repackaging, assembling orders, storing, relocating, shipping and distributing and in general managing the products used in manufacturing and also the finished products. These cost can be greatly reduced if redundancies in the system of managing such products are eliminated. This can be accomplished by packaging such products in modular receptacles that are part of a loading, unloading, storing and transporting system. An expensive component of such a system is the transporting device or vehicle. Additional cost reductions are available if the system does not tie up the transport vehicle while processing or storing the products. The transport vehicle typically represents the highest capitol investment component of such a system.

Systems and devices for storing and transporting modular receptacles are known in which a receptacle is supported above the ground and a transporting vehicle or truck is driven under the receptacle so that the receptacle can be transferred to the vehicle or truck. Some such systems, such as that shown in U.S. Pat. No. 2,379,094 include an elevating mechanism to effect the transfer, while others assume that the receptacle is supported at the ideal location to facilitate transfer to the vehicle or truck. In these prior art devices the receptacle's flat bottom surface rests on a corresponding flat supporting surface of the vehicle.

The original concept for this roll on roll off system was developed as a system for maneuvering, storing and transporting large banded bundles of fire wood. The machines and methods for forming these fire wood bundles is fully disclosed and claimed in U.S. Pat. No. 5,243,901 that issued on Sep. 14, 1993. This invention has a much broader and comprehensive application and use than that for which it was originally developed.

It is a primary objective of this invention to provide a roll on roll off device that can be used to manually load and unload a receptacle containing cargo to and from a receptacle platform such that the receptacle will be supported in a stable fashion and will be supported on the transport vehicle in a manner that it will not have a tendency to tip when the vehicle turns a sharp corner.

It is another object of the present invention to provide a roll on roll off system that includes a hoist that is integral with the device that will enable the receptacle to be loaded or unloaded at remote locations.

It is another objective of the present invention to provide a roll on roll off device that can be used to transport a plurality of large heavy bundles, such as bales of fire wood, and unload the heavy bundles at their destination in undamaged condition.

It is still another object of this invention to provide a system for managing a receptacle that includes a portable system such as a set of compact jacks that can be transported along with the receptacle to the destination or a location where the receptacle is to be unloaded.

It is yet another object of this invention to provide a power assist for operating the jacks and propel the container between the transport vehicle and the support.

SUMMARY OF THE INVENTION

To achieve these and other objectives, the present invention provides a new and unique roll on roll off system that can be used to load and unload receptacles on to a transport vehicle, store the receptacles such that they can easily reloaded to the transport vehicle, and load and unload articles from the receptacles.

The center of gravity of a loaded receptacle will always be above its bottom surface. The higher the center of gravity relative to the bottom surface, provided the receptacle is supported on its bottom surface, the more vulnerable the receptacle is to tipping over during transport. The receptacles of this invention are not supported on their bottom surface, rather they are supported at a level above their bottom surfaces and thus the center of gravity of the loaded receptacles are relatively close to the horizontal plane on which they are supported and the overall stability of the system is thereby improved.

The system can include an overhead boom that permits dumping of the receptacle or loading and unloading of receptacles to the transport vehicle.

This invention relates to a system for managing a receptacle, including loading and unloading the receptacle, storing the receptacle and transporting the receptacle. The system includes a storage platform that the receptacle can be rolled on to and off from. The system also includes a portable storage platform or independent support that can receive and from which the receptacle can be returned to the transport device. The portable storage platform can be in the form of a plurality of jacks that can be engaged as the receptacle is being disengaged from the transport vehicle. The plurality of jacks can be connected to the receptacle at the time that they are being engaged or can be carried by the receptacle in an inoperative mode from which they can be engaged when needed. Also the plurality of jacks can have bases that are flat or be fitted with wheels. The transport vehicle or device can transport the receptacle to another location where it can be discharged or rolled off to another storage platform provided storage platforms are available at the receiving location or can be discharged to the portable independent support if storage platforms are not available at the location. The set of portable jacks are compact and can be transported with the receptacle by the transport vehicle or device. The advantage of the set of jacks is that it is not necessary for a storage platform to be present at the place of delivery. Also if the transport vehicle is needed for the performance of other task, or is in need of repairs the receptacle can be easily and quickly removed and reloaded at locations where there is no special storage platform. The system can included, but does not require, an overhead boom mounted on the transport device that functions to load and unload the receptacle.

The roll on roll off concept can be applied to carriers such as pick up trucks, small trailers, large trailers pulled by highway tractors, flat beds or vans, small and large conventional vans, trains, ships, barges and airplanes. The system can accommodate loading and unloading the receptacle to and from the transport vehicle along the longitudinal axis of the vehicle or normal to the longitudinal axis of the vehicle. The application of the roll on roll off concept to such carriers does not prevent the carrier from being applied to its normal use.

The concept can be applied to the transportation of any commodity, including items hauled in military operations. The concept provides the means by which transportation vehicles such as automobiles may be designed to be easily convertible from the passenger mode to an open roll on roll off bed, roll on roll off van or station wagon.

When applying this concept to people transporters, a discharge compartment could be pre-loaded and rolled off at the passenger's destination or at a transfer point to another carrier vehicle and a pre-loaded new passenger compartment could be rolled on. Such a system would minimize the lay over time at stops and reduce the total time from the origin to the final destination.

The roll on roll off system disclosed herein can of course be used for the purpose for which it was originally conceived, managing large banded bundles of fire wood. However since the receptacle can take many different forms and shapes the system has limitless other uses. For example the receptacle could be a fuel or water tank, a portable office, a shipping container, a flat bed trailer, a portable tool shed or a camper. When used as a shipping container, trailers for highway tractor trailer trucks could be fitted with support surfaces that will permit the receptacles to be rolled in and rolled out of the trailers. The system is ideal for suppliers whose customers are using a just in time supply system. The daily order can be packaged into a roll on roll off receptacle, the receptacle rolled onto the suppliers vehicle, rolled off at the customers facility and the previously delivered empty receptacle rolled on the vehicle.

The roll on roll off system requires such a low input of power that an individual can manually roll a receptacle from the vehicle to a platform or reverse. However, power means for the roll on roll off system are also contemplated as well as for operating the various jacks used with various embodiments of the system. Such power assist means are important in situations where an operator is required to maneuver containers within the system for extended periods of time or when speed of operation is essential.

An embodiment of this invention has been enhanced by affixing a boom mechanism as an integral part of the system. By including a boom mechanism as a part of the system the receptacle can be loaded or unloaded at remote facilities where other power equipment is not available. Also receptacles can be of a size that the overhead crane or boom can pick up and unload or load entire receptacles at remote sites where there is no support platform to receive the receptacle. This is a significant improvement over prior art systems which are limited to loading and unloading the entire receptacle at the originating docking facility or a destination docking facility where storage platforms designed to receive the receptacle are available. The prior art devices do not contemplate loading and unloading articles from the receptacle that could not be handled manually. Not only can the boom mechanism load and unload the receptacles, it can be used to pick up entire receptacles and load them to or unload them from the wheeled vehicle. In addition the boom mechanism can be used to convert the receptacle into a dump bed by providing a pivotal connection between the receptacle and the transport vehicle. These features require that the horizontal flat support surfaces on the wheeled vehicle that support the wheels of the receptacle be unencumbered from above. Equivalent functions and advantages could be accomplished by the use of manual jacks or integral electric or hydraulic lifting devices.

Another application of this concept is the use of disposable roll on roll off containers. For example, a disposable container could be rolled off its carrier while the carrier remained in motion in the deployment of men and or materials in a battle field environment.

This inventive concept has significant advantages when applied to the local delivery area of commerce such as in the food and beverage businesses. Pre-loaded or pre-sorted containers can be quickly and efficiency rolled onto the transport vehicle rather than incapacitating the high capital investment vehicle while it is being loaded. The pre-loaded containers can then be quickly and efficiently unloaded, which in addition to the economical advantages will contribute greatly to the relief of traffic congestions.

An embodiment of the system could have the wheels on one side of the receptacle at a higher or lower elevation than the wheels on the other side, to accommodate loading or unloading from a side of the receptacle.

Another embodiment of the system could have the wheels at one end of the receptacle elevated relative to the wheels at the other end such that when the receptacle is released it unloads itself by rolling down a ramp.

An embodiment of the system that is unique to this application includes a set of compact jacks that can be transported along with the receptacle such that the receptacle can be discharged and reloaded at locations where there is no storage platform. The set of jacks can provide bases that remain stationary on the ground or can include wheels which will permit the discharged receptacle to be moved.

The present invention is directed to a system for managing a receptacle that includes a set of compact jacks and thus does not require a special storage platform at the unloading destination. Power operated means can be integrated with the various embodiments of the invention to assist in operating the jacks and for moving the containers on and off the transport vehicle.

These and other objects and advantages of the present invention will no doubt become apparent to those skilled in the art after having read the following detailed description of the preferred embodiment which are contained in and illustrated by the various drawing figures.

BRIEF DESCRIPTION OF DRAWING

FIG. 1 is a perspective view of the preferred embodiment of the roll on roll off device in which a roll on roll off receptacle is at rest on a wheeled vehicle which is parked adjacent a receptacle storage platform.

FIG. 2 is rear view of the wheeled vehicle having a receptacle storage platform mounted thereon.

FIG. 5 is a perspective view of the receptacle storage platform seen from the open roll on roll off receiving end and having a single roll on roll off receptacle resting thereon.

FIG. 6 is a perspective view of the receptacle storage platform seen from its closed end and having several roll on roll off receptacles resting thereon.

FIG. 7 is a perspective view of an embodiment of a wheeled vehicle in which the manually operated overhead swinging boom has been replaced by an electric hydraulic boom.

FIG. 9 is a rear view of embodiment shown in FIG. 8 with the roll on roll off receptacle horizontal.

DETAILED DESCRIPTION OF THE PREFERRED EMBODIMENT

Figure 3:
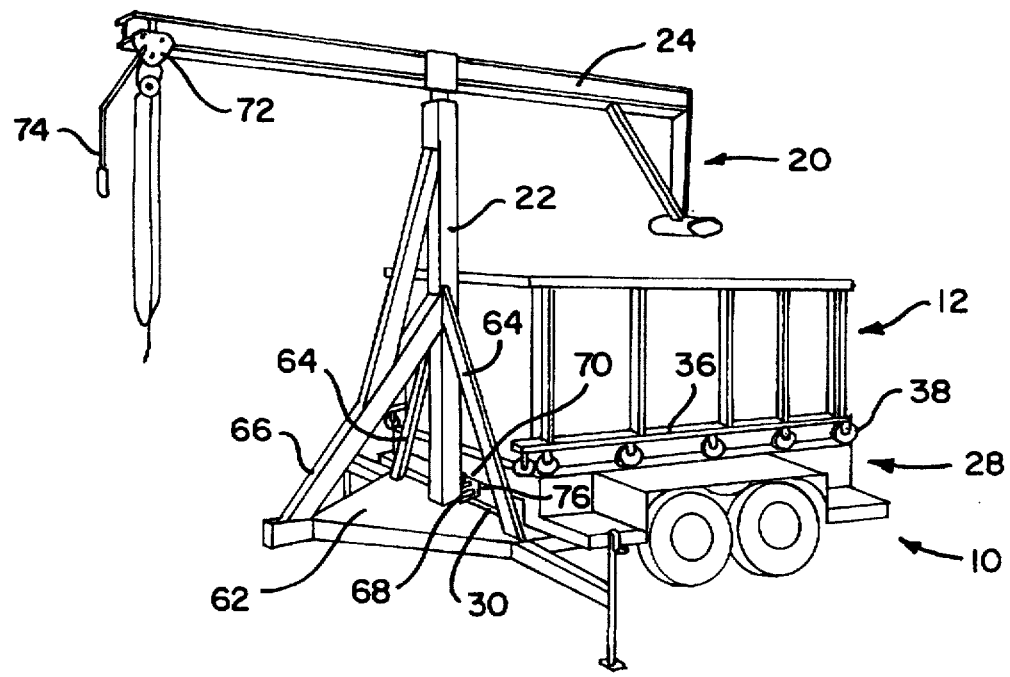
FIG. 3 is a perspective view of the wheeled vehicle with a roll on roll off receptacle supported thereon.

FIG. 1 discloses the roll on roll off receptacle 12 at rest on a wheeled vehicle 10 with a receptacle storage platform 14 aligned such that the pair of elongated flat support surfaces 34 of the wheeled device or vehicle 10 are aligned with the pair of elongated flat support surfaces 52 of the receptacle storage platform 14.

The wheeled device or vehicle 10 is built around a frame 18 to which are mounted the ground engaging wheels 16 and the other components. The overhead swinging boom 20 is secured to the frame 18 by support members that will be discussed in more detail in the discussion of FIG. 3. The overhead swinging boom 20 includes a vertical pedestal 22 that supports a horizontal beam 24 at its upper end for swinging motion about a vertical axis. A hoist trolley 72, not seen in this view, is carried by the horizontal beam 24. The opposed end of the horizontal beam 24 is provided with a counterweight 26 which facilitates the swinging motion of the overhead swinging boom 20. The overhead swinging boom 20 is anchored at one longitudinal end of the wheeled device or vehicle 10 which shall be referred to as the closed end 30. The end of the wheeled device or vehicle 10 opposite to the closed end 30 shall be referred to as the open roll on roll off receiving end 28. The pair of elongated flat support surfaces 34 are supported by the frame 18 and are designed to support substantial weight since the entire weight of the roll on roll off receptacle 12 and its cargo are carried by these surfaces. A plurality of ground engaging jacking mechanism 32 are secured to the frame 18 and can function to stabilize the wheeled device or vehicle 10, for aligning the surfaces 34 and 52 or to relieve pressure on the ground engaging wheels 16 if the wheeled device or vehicle 10 is to be left stationary for a long time period. The roll on roll off receptacle 12 disclosed in this Figure is basically an open top box having a door 40 that is connected by set of hinges 42 and can be secured closed by latches 44. The roll on roll off receptacle 12 could take the form of numerous functional components such as a tool box, a portable office, a modular container or numerous devices. The roll on roll off receptacle 12 has on each longitudinal side a support beam 36 which is structurally supported by vertical beams. A set of aligned rollers 38 are supported by the support beams 36 and extend down from its bottom surface.

The receptacle storage platform 14 functions to support a roll on roll off receptacle 12 at the level relative to the ground that it is supported on the wheeled device or vehicle 10. The receptacle storage platform 14 is constructed of beams that form a frame 46. A plurality of ground engaging wheels 48 are secured to the corners of the frame 46 that enable a person to easily move the empty receptacle storage platform 14 around and with some effort move a receptacle storage platform 14 with a loaded roll on roll off receptacle 12 supported thereon. The receptacle storage platform 14 has three ground engaging jacking mechanisms 50 secured thereto that can be raised out of contact with the ground when the receptacle storage platform 14 is to be moved from one place to another and can be lowered into contact with the ground when it is desired to align the pair of elongated flat support surfaces 52 with the cooperating pair of elongated flat support surfaces 34 of the wheeled device or vehicle 10. The ground engaging jacking mechanism 50 would normally be lowered when the receptacle storage platform 14 is being used to store a loaded roll on roll off receptacle 12 for a long period.

FIG. 2 is a rear view of a wheeled device or vehicle 10 having a roll on roll off receptacle 12 mounted thereon. In this Figure the generally horizontal axis about which the ground engaging wheels 16 are mounted for rotation is illustrated and identified as X—X. The generally horizontal axis X—X is spaced above the ground line a distance represented by D1 and the distance between the inner surfaces of the ground engaging wheels 16 is represented by D2. In this Figure the horizontal bottom surface of the wheeled device or vehicle 10 is identified by reference number 56 and the horizontal bottom surface of the roll on roll off receptacle 12 is identified by 58. It should be noted that there is a clearance between horizontal bottom surfaces 56 and 58 which prevents frictional resistance between these surfaces when the roll on roll off receptacle 12 is rolled on and off. This clearance also allows sufficient air flow to dry up any moisture that has collected on surface 56 and thus prevent this surface from rusting. The pair of elongated flat support surfaces 34 of the wheeled device or vehicle 10 are shown, in this Figure, as having the set of aligned rollers 38 of the roll on roll off receptacle 12 resting thereon.

The pair of elongated flat support surfaces 34 overlay the upper surface of the ground engaging wheels 16 and is thus located above the horizontal axis X—X a distance that is greater than D1. Since the flat support surfaces 34 overlay the ground engaging wheels 16 the transverse distance between rollers 38 is greater than the distance D2. It is apparent that the greater this distance is the more stable the roll on roll off receptacle 12 becomes, especially when the wheeled vehicle is negotiating a sharp curve. As the wheeled device or vehicle 10 is being transported and particularly when it is manipulating a corner there will be a tendency for the roll on roll off receptacle 12 to tip upwardly about the set of aligned rollers 38, as an axis, that are on the inside radius of the turn. It should be noted that aligned rollers 38 are confined to the elongated flat support surfaces 34 by gravity alone and there is nothing restraining upwardly movement therefrom. The center of gravity of the roll on roll off receptacle 12 including its load has been arbitrarily located and is represented by the point identified as CG in FIG. 2. The CG is a distance D3 above the horizontal plane of the pair of elongated flat support surfaces 34. If the roll on roll off receptacle 12 were resting on the horizontal bottom surface 56 of the wheeled device or vehicle 10 rather than the pair of elongated flat support surfaces 34 than the distance between the center of gravity of the roll on roll off receptacle 12 and the horizontal plane of the supporting surface would be considerably greater than D3 and the tendency for the roll on roll off receptacle 12 to flip off of the wheeled device or vehicle 10 when making a sharp turn would be much greater. Thus by elevating the pair of elongated flat support surfaces 34 above the bottom surface of the roll on roll off receptacle 12, the stability of the system has been increased considerably.

FIG. 3 is a front side perspective view of the wheeled device or vehicle 10 having a roll on roll off receptacle 12 supported thereon that is isolated from the receptacle storage platform 14. In this view the entire horizontal beam 24 is shown which includes a hoist trolley 72 slidable mounted thereon. The hoist trolley 72 includes a handle 74 which can be used to slide the hoist trolley 72 along the horizontal beam 24 and to pivot the horizontal beam 24 about the vertical pedestal 22. This view further illustrates the pedestal platform 62 upon which the vertical pedestal 22 and its supports are mounted. A pair of transverse supports 64 extend from the vertical pedestal 22 to the pedestal platform 62 to provide transport support to the vertical pedestal 22. A fore and aft support 66, which includes a first beam that extends from the pedestal platform 62 to the vertical pedestal 22 and a second beam that extends from the first beam to the vertical pedestal 22, provides fore and aft support for the vertical pedestal 22. At the rear base of the vertical pedestal 22 there is an anchor device 68 that has a vertical opening formed therein. The anchor device 68 cooperates with an anchoring device 76 carried by the roll on roll off receptacle 12 which also has a vertical opening formed therein. The vertical openings in the anchor device 68 and anchoring device 76 are aligned and receive an anchoring pin 70 which functions to secure the roll on roll off receptacle 12 in place on the wheeled device or vehicle 10. It should be understood that although a single pair of cooperating anchoring devices 68 and 76 have been disclosed in some situations multiple pairs have been found to be advantageous.

With the roll on roll off receptacle 12 secured to the wheeled device or vehicle 10 the wheeled device or vehicle 10 can be hitched to a towing vehicle and transported from place to place. When it is desired to unload cargo contained in the roll on roll off receptacle 12 or to load cargo into the roll on roll off receptacle 12 the horizontal beam 24 is swung around by the handle 74 and the hoist trolley 72 manipulated such that the loading or unloading operation is accomplished.

Figure 4:
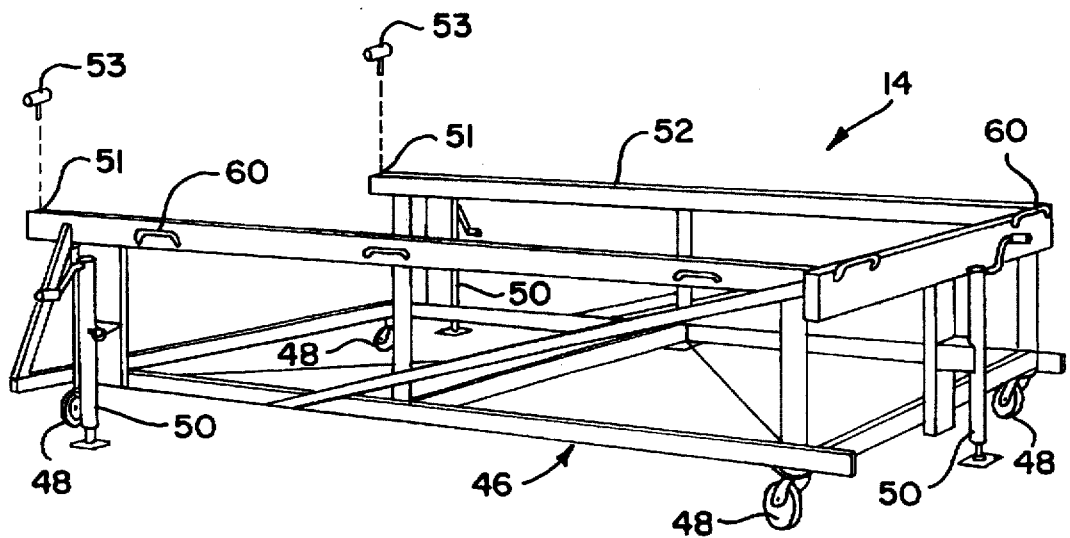
FIG. 4 is a perspective view of the isolated receptacle storage platform which clearly shows the ground engaging wheels and the jacking mechanisms.

FIG. 4 is a perspective view of the isolated receptacle storage platform 14 which clearly shows the ground engaging wheels 48 and the jacking mechanisms 50. A series of handles 60 are secured to frame 46 of the receptacle storage platform which can be used when the operator is manipulating the platform. It should be noted that there are two jacking mechanisms 50 at end of the receptacle storage platform 14 that receives the roll on roll off device 12. These jacking mechanisms 50 can be individually adjusted to accurately align the flat support surfaces 34 of the wheeled device or vehicle 10 with the cooperating flat support surfaces 52 of the receptacle storage platform 14. A single, centrally located jacking mechanism 50 is located at the opposed end of the receptacle storage platform 14. A vertical hole 51 is drilled in the free end of the each frame member that forms the pair of elongated flat support surfaces 52. A stop 53 can be inserted and removed from the vertical holes 51 after the roll on roll off receptacle has been properly located on the receptacle storage platform. The stop 53 functions as a safety device preventing the roll on roll off receptacle from rolling off the receptacle storage platform 14 in the event a ground engaging jacking mechanism 50 is inadvertently misadjusted or a wheel 48 collapses. It has been found that a stop 53 that is about one sixth the height of the aligned rollers 38 is an appropriate size. Similar stops can be applied at the other end of the receptacle storage platform 14.

FIG. 5 is a perspective view of the receptacle storage platform 14, seen from the open roll on roll off receiving end 28, with a roll on roll off receptacle 12 resting thereon. Also shown in this view 5 are horizontal bars 80 along the upper longitudinal edges of the receptacle 12 that are used to wrap strapping around when it is desired to secure cargo in the receptacle. The horizontal bars 80 can also be grasped by an operator to manipulate the receptacle 12 when rolling it between the receptacle storage platform 14 and the wheeled device or vehicle 10.

As seen in FIG. 1 the receptacle storage platform 14 was located adjacent the wheeled device or vehicle 10 with a roll on roll off receptacle 12 resting thereon. The receptacle storage platform 14 can be easily maneuvered by one person when the ground engaging jacking mechanism 50 are raised and the receptacle storage platform 14 is supported on the ground by its wheels 48. The operator can use the handles 60 (see FIG. 4) to manipulate the receptacle storage platform 14 until its pair of elongated flat support surfaces 52 are close to alignment with the corresponding pair of elongated flat support surfaces 34 of the wheeled device or vehicle 10. When this is accomplished the ground engaging jacking mechanism 50 of the receptacle storage platform 14 are extended to raise the receptacle storage platform 14 such that it is no longer supported by its wheels 48. When the receptacle storage platform 14 is supported by the ground engaging jacking mechanism 50 it becomes stationary. The wheeled device or vehicle 10 also has ground engaging jacking mechanism 32 which can be adjusted to attain vertical alignment of the pair of elongated flat support surfaces 34 of the wheeled device or vehicle 10 with the pair of elongated flat support surfaces 52 of the receptacle storage platform 14. When the pair of elongated flat support surfaces 34 and pair of elongated flat support surfaces 52 have been aligned, the roll on roll off receptacle 12 is rolled from the wheeled device or vehicle 10 to the receptacle storage platform 14. This transfer operation can easily be accomplished by one person, even if the roll on roll off receptacle 12 is heavily loaded. The operator can use the horizontal bars 80 in rolling the roll on roll off receptacle 12 onto the receptacle storage platform 14. The receptacle storage platform 14 can be used to store either full or empty roll on roll off receptacle 12 for an indefinite period. When it is desired to move the roll on roll off receptacle 12 the reverse of the above described process is performed to thus transfer the roll on roll off receptacle 12 back to the wheeled device or vehicle 10.

FIG. 6 is a view similar to FIG. 5, differing in that this view is from the opposite end and instead of a single large roll on roll off receptacle 12 there are four smaller receptacles 12. In FIG. 6 the closed end 30 of the receptacle storage platform 14 is seen rather than the open roll on roll off receiving end 28. In this view the centrally located ground engaging jacking mechanism 50 is clearly shown. The four independent roll on roll off receptacles are intended to demonstrate that multiple receptacles can be carried by a wheeled vehicle 10 or supported on a receptacle storage platform 14. It is of course necessary that the width of the receptacles be consistent so that the rollers 38 properly engage with the elongated flat support surfaces 34 and 52. Each of the receptacles 12 shown in FIG. 6 is designed to carry two half-cord banded bundles of fire wood. The size of the receptacles can of course be customized for the product that they are intended to handle.

Receptacles of the size shown in FIG. 6 can be fitted with channels on their bottoms to receive the prongs of a fork lift truck. The receptacles can then be picked up by the fork lift from the ground, a receptacle storage platform or a wheeled vehicle. This of course renders the system much more versatile because when delivering a load of receptacles such as those shown in FIG. 6 to a destination they can be unloaded by a standard fork lift and the need for a special designed receptacle storage platform is not required.

FIG. 7 is a rear perspective view of an embodiment of the wheeled vehicle 10 having an electric hydraulic boom or powered boom mounted thereon. The boom support 82 is located at the forward end of the wheeled device or vehicle 10 and has at its base a support platform 86. Extending upwardly from the support platform 86 is a vertical pillar 88 which is braced by transverse diagonal supports 90 and a fore and aft support 92. The electric hydraulic boom or powered boom 84 is mounted on top of the hoist support 82 and is shown in this Figure in a stored or transport mode. A transversely extending control arm 94 extends to one side such that the control cord 96 is conveniently located for the operator. The boom arm 98 is of the type that can extend and retract and can also pivot about a horizontal axis. The electric hydraulic boom or powered boom 84 is a commercially available product and is not of its self a part of this invention. In FIG. 7 the free end of the boom arm 98 is shown secured to the support platform 86 by a pair of guide lines 100.

Figure 8:
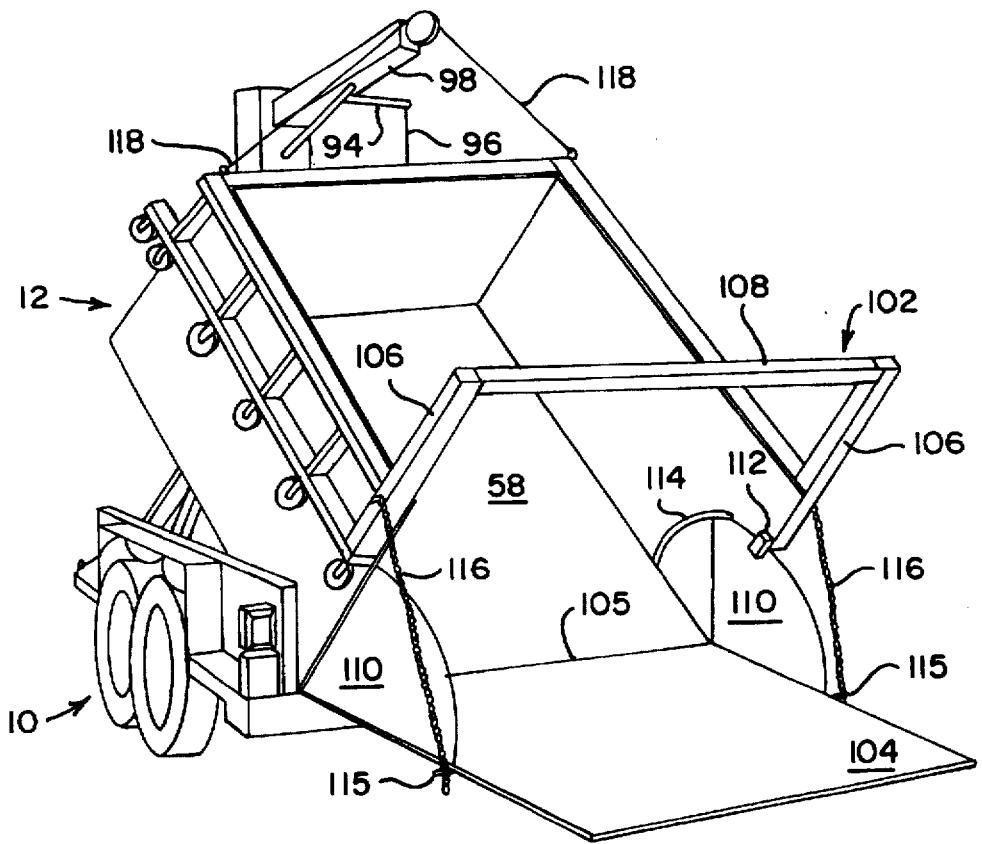
FIG. 8 is rear perspective view of a dump embodiment of the roll on roll off receptacle.

In FIG. 8 a dump embodiment of the roll on roll off receptacle carried by the wheeled vehicle of FIG. 7 is illustrated. The receptacle is shown in the raised position with the door 104 opened such that its upper surface is horizontal. The open end support 102 functions to prevent the upper edges of the side walls of the receptacle from bending outwardly when the receptacle is loaded. It is important that these side walls remain vertical so that they do not bind against the side walls of the wheeled vehicle 10, to insure that the set of aligned rollers 38 are properly aligned with the pair of elongated flat support surfaces 34 of the wheeled device or vehicle 10, and to insure proper operation of door 104. The open end support 102 includes vertical supports 106 that are securely fastened to the rear end of the side walls of the roll on roll of receptacle 12 and extend upwardly of the side wall's upper edges. The upper ends of the vertical supports 106 are interconnected by a horizontal support 108. The door 104 is pivotally connected along a hinge 105 and includes side plates 110 that have arcuate edges and are secured to the door 104 and extend normal thereto. The arcuate side plates 110 telescope with the inner surface of the side walls of the roll on roll off receptacle 12. At the rear edges of the roll on roll off receptacle's side walls there are guides 112 that insure that the arcuate side plates 110 remain closely adjacent the side walls of the roll on roll off receptacle 12. Also mounted on the inner surfaces of the side walls of the roll on roll off receptacle 12 are edge restrainers 114 that also contribute to maintaining the side plates 110 in proper position relative to the side walls of the roll on roll off receptacle 12. A pair of chains 116 are secured at one end to the vertical supports 106 and can be connected to mounting devices 115 on the door 104. The mounting devices 115 permit the chains 116 to be secured to the door 104 at any point along its length. In FIG. 8 the chain is connected to the door 104 at a point along its length that will cause the 104 to be horizontal when the roll on roll off receptacle 12 is raised as illustrated. This arrangement permits loose material such as cut and split fire wood to flow down to the horizontal surface of the door 104 where it is convenient to grasp and stack into wood piles or into a fire wood bailing machine. The open end support 102 is important in insuring the proper operation of the door 104. If the side walls of the roll on roll off receptacle 12 were allowed to bend outwardly then the side plates 110 of the door 104 would bind and become immovable relative to the guide 112 and edge protector 114. Since this receptacle is designed to carry heavy loads, it has a framework in the form of a grid below the bottom surface which adds substantially to the structural integrity of the receptacle.

The boom arm 98 can be extended and retracted and can also pivot about a horizontal pivot axis thus causing its free end to raise and lower. In FIG. 8 the boom arm 98 has been pivoted upwardly about its horizontal axis and has through the guide wires 118 picked up the front end of the roll on roll off receptacle 12 thereby causing it to pivot about a pivotal connection between the roll on roll off receptacle 12 and wheeled device or vehicle 10 (see FIGS. 7 and 9).

FIG. 9 shows the pivoting mechanism for pivotally connecting the bottom rear edge of the roll on roll off receptacle 12 to the bottom rear edge of the wheeled vehicle 10 of FIG. 8. Two sets of arms 120 extend downwardly from the bottom rear edge of the roll on roll off receptacle 12. A cylindrical member 122 is secured to the free end of each of the arms 120, such that there is a space between the cylindrical members 122 in each set. A cylindrical member 124, corresponding to each set of arms 120, is secured to the bottom rear edge of the wheeled vehicle 10, and is sized and located to fit in the space between the cylindrical members 122. The cylindrical members 122 and 124 have an aligned cylindrical opening 126 bored therethrough that receives pivot pins 128. The pivot pins have toggles 130 to prevent their unintentional removal.

Figure 10:
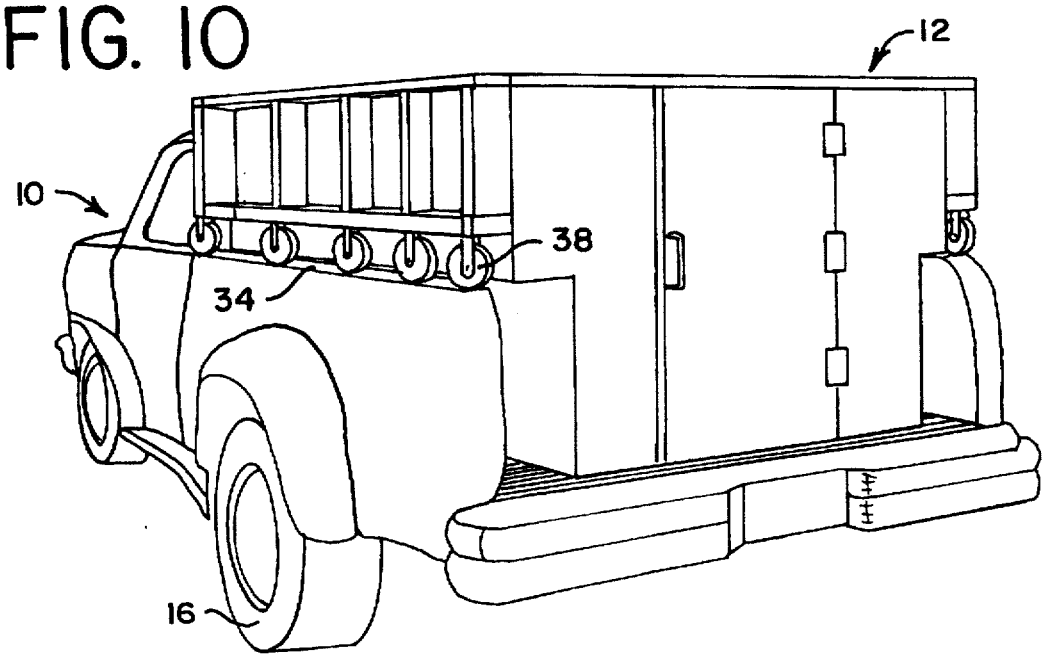
FIG. 10 is a rear perspective view of a roll on roll off receptacle mounted on the bed of a pick up truck.

FIG. 10 shows a pick-up truck 10 having a roll on roll off receptacle 12 mounted thereon. It should be noted that the roll on roll off receptacle 12 used in this embodiment has a transverse cross section in the form of an inverted T. The lower portion of this roll on roll off receptacle 12 must be narrower to accommodate the wheel wells for the rear wheels of the pick-up truck 10.

In this embodiment the roll on roll off receptacle 12 can take many forms such as a tool shed, a mobil office, a camper or any of the numerous uses mentioned earlier for roll on roll off receptacle 12. The roll on roll off concept is particularly useful with a pick-up truck which is normally put to many uses where the receptacle is not required. The roll on roll off receptacle 12 can be quickly rolled on to the pick-up truck when it is desired and rolled off for storing on a receptacle storage platform when not required. A manually operated jacking mechanism and a pivot connection between the rear edges of the roll on roll off receptacle 12 and the truck bed of the type shown in FIG. 9, could be provided to thereby add the dumping feature to this embodiment.

Figure 11:
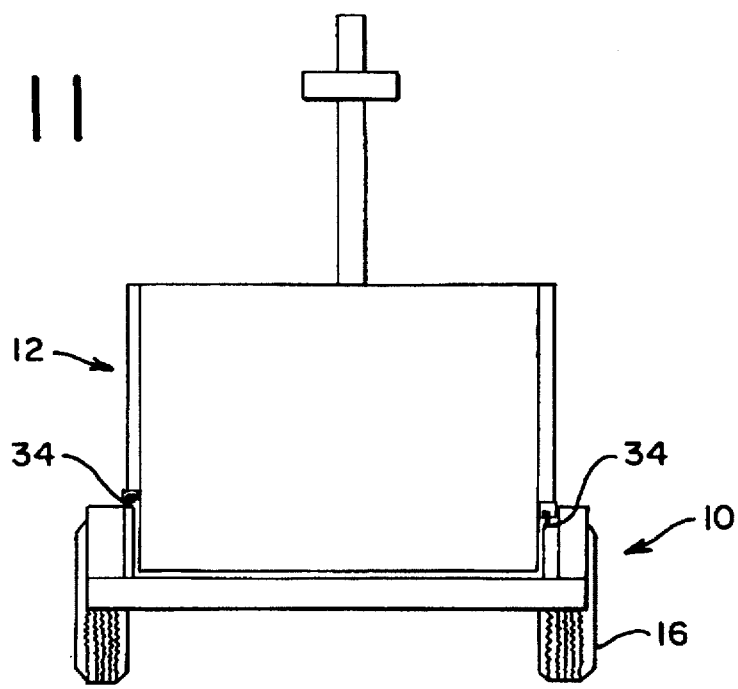
FIG. 11 is a rear view of an embodiment of the invention in which the support surface on one side of the wheeled vehicle is at a higher location than the support surface on the other side of the vehicle.

In FIG. 11 there is an embodiment of the invention illustrated in which the support surface 34 on the right hand side of the vehicle, as seen in this Figure, are at a lower elevation than the support surface 34 on the opposite side of the vehicle. This embodiment allows a greater portion of the right hand side of the receptacle 12 to be utilized as an access opening for loading and unloading the receptacle 12. This Figure is also intended to illustrate that it is not essential that the support surfaces 34 on opposite sides of the wheeled vehicle be at the same elevation.

Figure 12:
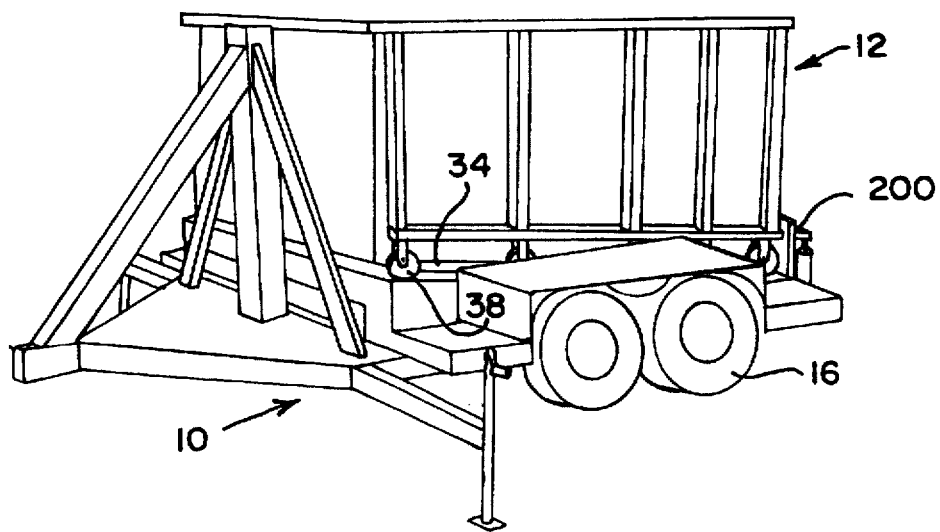
FIG. 12 is a perspective view of an embodiment of the invention in which the support surfaces decline from the front of the wheeled vehicle to its rear.

In FIG. 12 there is another embodiment of the invention illustrated in which the support surfaces 34 decline from the front of the wheeled vehicle 10 toward the rear of the vehicle. In this embodiment releasable restraining means 200 are provided, that when in the active position, prevent the receptacle 12 from rolling down and off the wheeled vehicle 10. The releasable restraining means 200 can be remotely disengaged by the operator, to thereby permit the receptacle 12 to roll down the declined support surfaces 34 under the force of gravity. It should be understood that the receptacle 12 could roll onto a receptacle storage platform 14 of appropriate height or could be discharged to the ground. This embodiment will permit the discharge of a receptacle 12 to the ground while the wheeled vehicle is moving forward.

Figure 13:
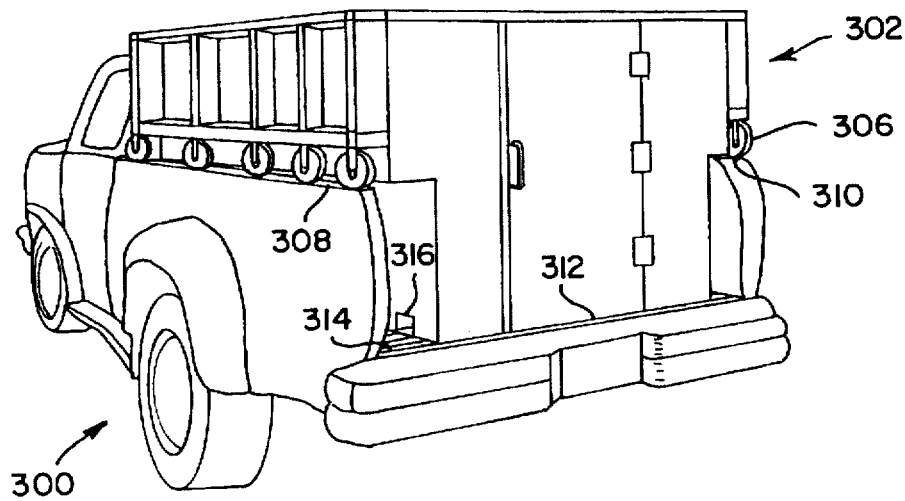
FIG. 13 is a perspective view of an embodiment of the invention in which the container is supported on a transport vehicle and unloaded to a portable independent support.

FIGS. 13 through 18 are a series of illustrations of another embodiment of the applicants invention. In the illustrations of this embodiment the transport vehicle 300 is shown as a pick up truck however the invention could be used with any type of vehicle or transport device. For example the transport vehicle could be a small trailer, a large trailer pulled by a highway tractor, a flat bed truck, a small or large van, a train, a ship, a barge or an airplane. As seen in FIG. 13, the container 302 includes two sets of rollers 304 and 306 that are secured to horizontal bottom support surfaces such that they are horizontal to each other. The transport vehicle 300 includes a pair of elongated flat support surfaces 308 and 310 that extend horizontal to the ground and parallel to each other. The flat support surfaces 308 and 310 are unencumbered from above and are located on the transport vehicle 300 such that they function to support the container 302 through the sets 304 and 306 of rollers. The container 302 is supported on the transport vehicle 300 at a fixed elevation above the ground such that the bottom surface 312 of the container is spaced from and not in contact with the bottom surface 314 of the transport vehicle 300. The sets of rollers 304 and 306 and the flat support surfaces 308 and 310 function as cooperating anti-friction mechanisms that will permit the container 302 to be rolled on and off the transport vehicle 300 with little effort. The transport vehicle 300 and container 302 include cooperating anchor devices that function to secure the container 302 in place on the transport vehicle 300. Anchoring devices such as devices 68 and 76 as shown in FIG. 3 or stop mechanisms such as 53 and 51 as shown in FIG. 4 could be used for this purpose.

In this embodiment independent support for the container 302 is transported with the container and transport vehicle rather than relying on a special storage platform being available at the location where the container is to be unloaded. It is important that the portable independent support is capable of supporting the container at the same elevation above the ground as it will be or was supported on the transport vehicle so as to insure a smooth relative movement therebetween. In this respect it should be noted that if multiple transport vehicles are used their support surfaces may not be located at equal elevations above the ground. For this reason the independent support used in this embodiment is in the form of a set of jacks 318 that can be adjusted to support the container at a selected elevation above the ground.

As seen in FIG. 13 a socket 316 is provided near the bottom of the container 302 for receiving one of the jacks 318.

Figure 14:
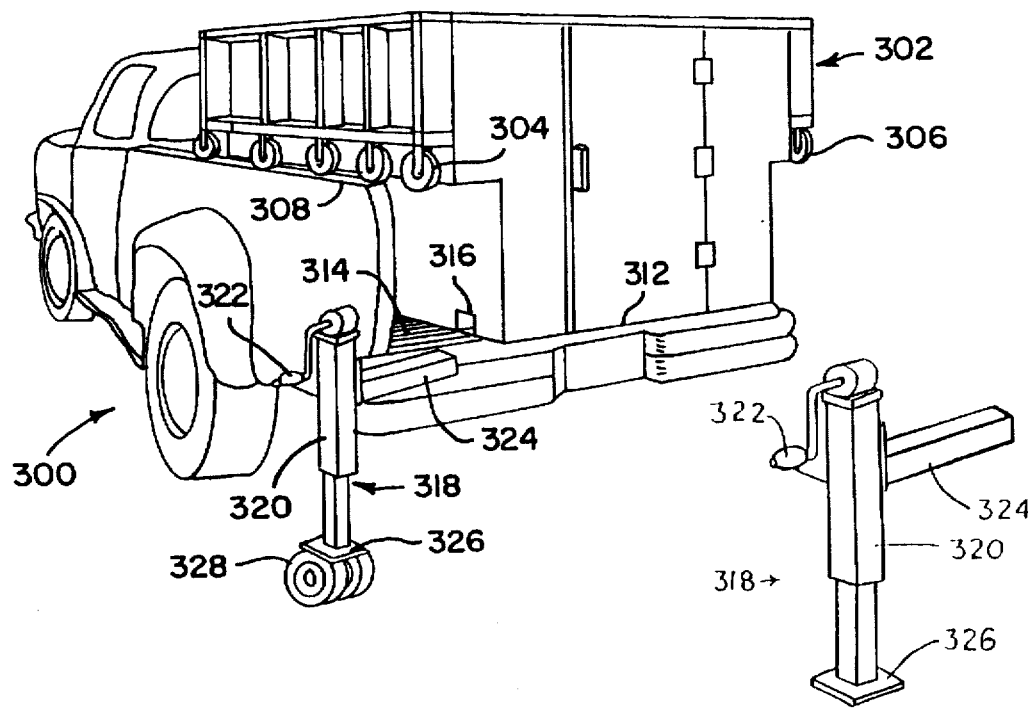
FIG. 14 is a perspective view of the embodiment seen in FIG. 13 in which the container has been moved relative to the transport vehicle to a position where a portion of the independent support can be attached.

In FIG. 14 the container 302 has been rolled rearwardly to a first position, at which the entire weight of the container is supported by the transport vehicle 300, however the socket 316 is no longer overlaying the transport vehicle 300. It should be noted that there is a second socket 316 on the hidden side of the container that corresponds to the socket that is visible in FIG. 14. One of the portable jacks 318 is shown in FIG. 14. Jack 318 includes a telescoping square barrel section 320 and a crank 322 which can be rotated in either direction to expand or contract the telescoping square barrel section 320. A solid steel bar 324 is secured perpendicular to the outer barrel section such that it extends substantially horizontal. A flat base 326 is secured to the bottom end of the inner telescoping square barrel section 320 such that it extends substantially horizontal. A set of wheels 328 are mounted to the bottom surface of the flat base section 326. The jack 318 is attached to the container by sliding the solid steel bar 324 into the socket 316 of the container.

Also illustrated in FIG. 14 is a second jack 318 which differs from jack 318 only in that it does not include the set of wheels 328. As will be discussed in more detail the wheels 328 allow the container to be moved relative to the ground and the container to be moved relative to the transport vehicle 300, however in some situations this may not be necessary or desirable. The wheels 328 can be detachable from the base section 326 or a different set of jacks without wheels could be provided.

Figure 15:
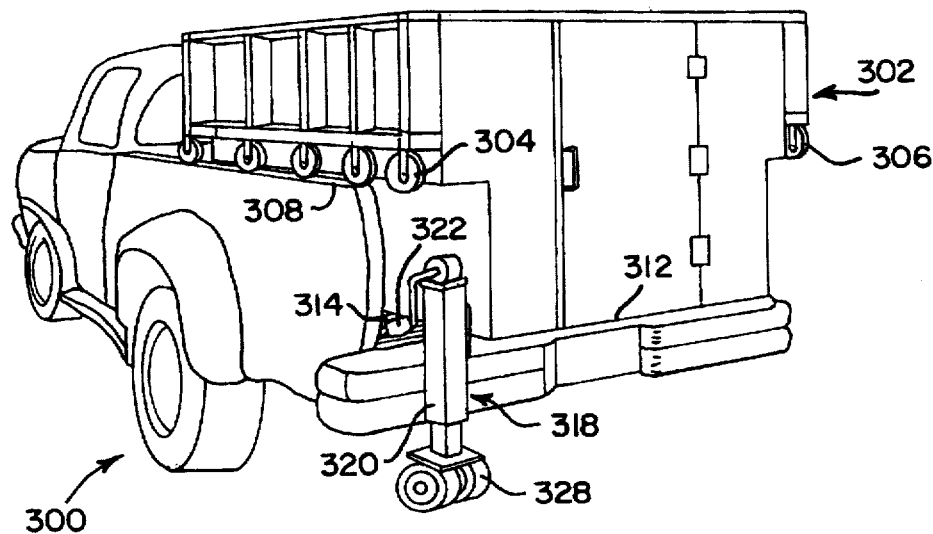
FIG. 15 is a perspective view of the embodiment seen in FIG. 13 in which one of the jacks of the independent support has been attached to the container but has not been attached to accept responsibility for a portion of the support for the container.
Figure 16:
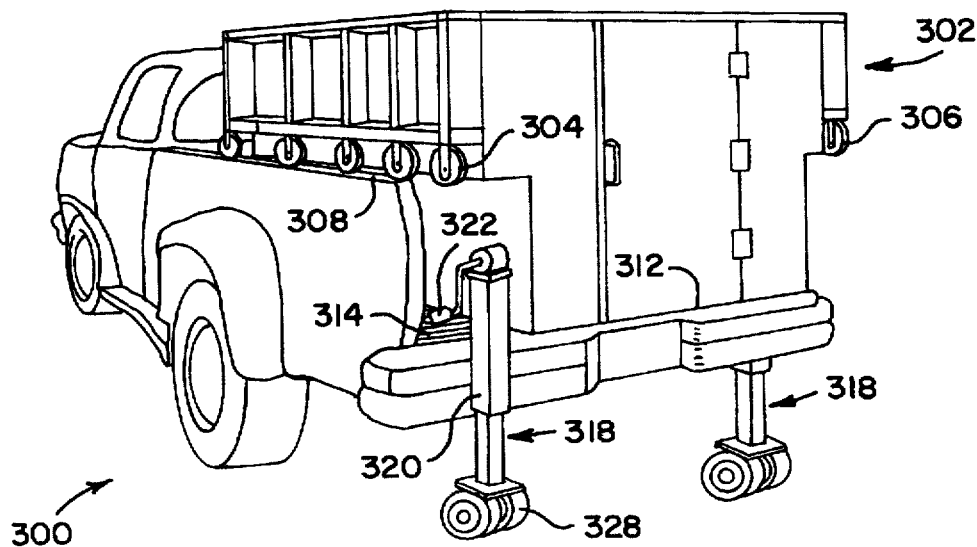
FIG. 16 is a perspective view of the embodiment seen in FIG. 13 in which the jack seen attached in FIG. 15 has now been extended to accept responsibility for a portion of the support of the container.

In FIG. 15 one of the jacks 318 has been attached to the container 302. It should be noted that in this illustration the telescoping square barrel section 320 has been contracted such that the wheels 328 are not in contact with the ground. In FIG. 16 both rear jacks have been attached to the container 302 and both of these jacks have been expanded such that the wheels are in engagement with the ground and the jacks have accepted responsibility for a portion of the support for the container 302.

Figure 17:
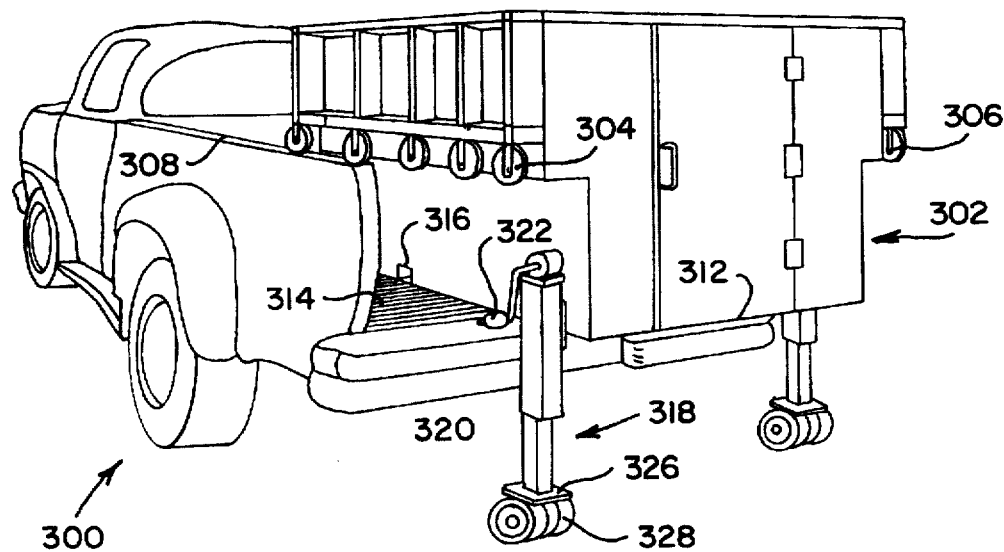
FIG. 17 is a perspective view of the embodiment seen in FIG. 13 in which the a pair of jacks have been attached and extended and the container has been moved relative to the transport vehicle to a position where additional portions of the independent support can be attached and extended.

In FIG. 17 the container 302 has been moved relative to the transport vehicle 300 to a second position at which position the transport vehicle continues to contribute to the support of the container 300. However at this second position the forward sockets 316 no longer overlay the transport vehicle. It should be noted that if the jacks 318 including wheels 328 are used, the container can be pulled rearwardly from the first position (FIG. 14) to the second position (FIG. 17), with the wheels 328 traversing the ground. If, however, the jacks 318A, without wheels, are used the transport vehicle 300 is driven forward a distance sufficient to cause the necessary relative movement between the vehicle and the container.

Figure 18:
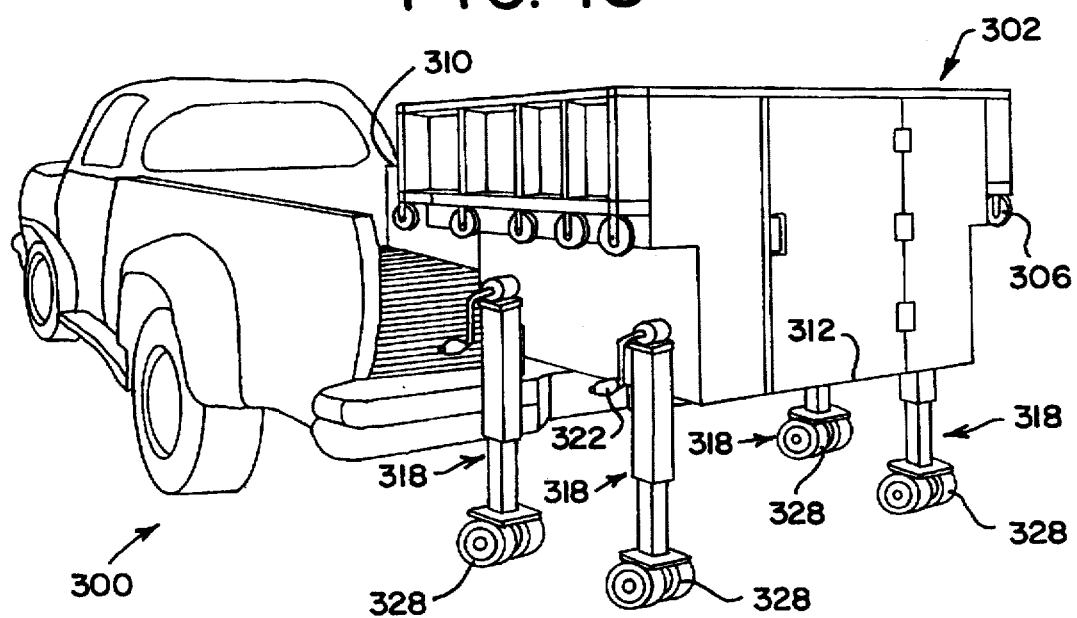
FIG. 18 is a perspective view of the embodiment seen in FIG. 13 in which the container is completely supported by the independent support and is completely separated from the transport vehicle.

With the forward set of sockets 316 exposed, the forward jacks 318 are attached and expanded sufficiently that the set of jacks 318 now have full responsibility for supporting the container. In FIG. 18 the transport vehicle 300 has been driven forward or the container has been rolled rearwardly to complete the transfer of the container from the transport vehicle to the independent support.

The set of jacks 318 are of compact design and could be carried in the container or be carried in the transport vehicle or mounted to it is some fashion.

Figure 19:
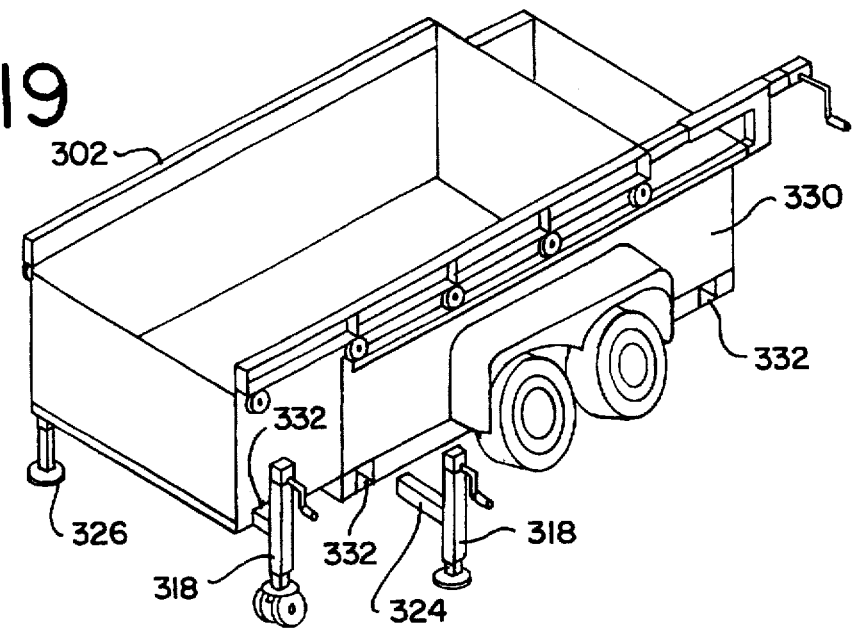
FIG. 19 is a perspective view of a towed type wheeled vehicle having a roll on roll off container mounted thereon.

FIG. 19 is a modification of the embodiment shown in FIG. 13 through 18 in which a towed type wheeled vehicle 330 is utilized rather than a self propelled vehicle. In this modification the wheeled vehicle 330 has sockets 332 that can receive the solid bar 324 of the jacks 318. The jacks 318 when connected to the vehicle 330 function to stabilize the vehicle or to elevate it to a level to receive a container 302. The container 302 also has sockets 332 for receiving the jacks 318. The jacks 318 can have wheels which are useful when the base is asphalt or concrete or a flat base 326 for use with a soft base. When jacks with flat bases are used the towed vehicle 330 is pulled forward to insert the forward set of jacks 318. It is also illustrated in this view how jacks similar to jacks 318 can be used to push the container 302 rearwardly sufficient to expose the rear most sockets 332 so that the jacks 318 can secured to the container.

Figure 20:
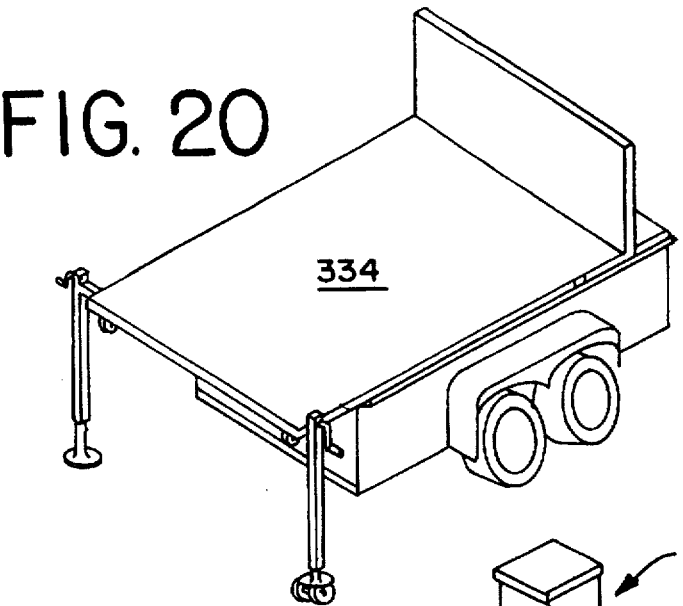
FIG. 20 is a perspective view of a towed type wheeled vehicle having a flat bed type roll on roll off platform mounted thereon.

FIG. 20 is a modification of the container 302 shown in FIG. 19. In FIG. 20 a flat bed receptacle 334 is disclosed.

Figure 21:
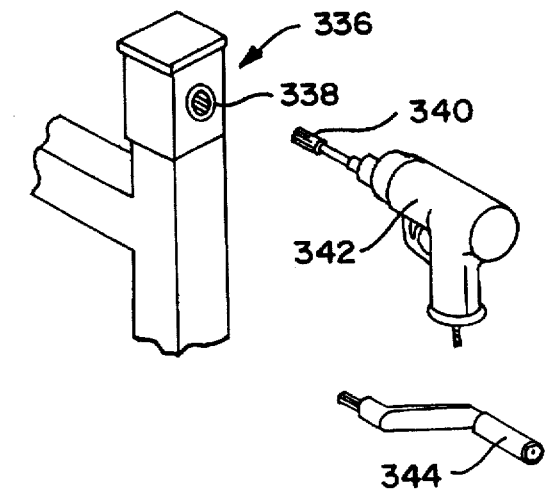
FIG. 21 is a perspective view of a power source for the jacks.

In FIG. 21 there is illustrated an embodiment of the jack 336 that has an internally splined driven member 338. The jack 336 is expanded and contracted by sliding an externally splined driver 340 into the internally splined driven member 338 and then rotating the driver 340. The driver 340 can be rotated by a power drill 342 or by a hand crank 344.

Figure 22:
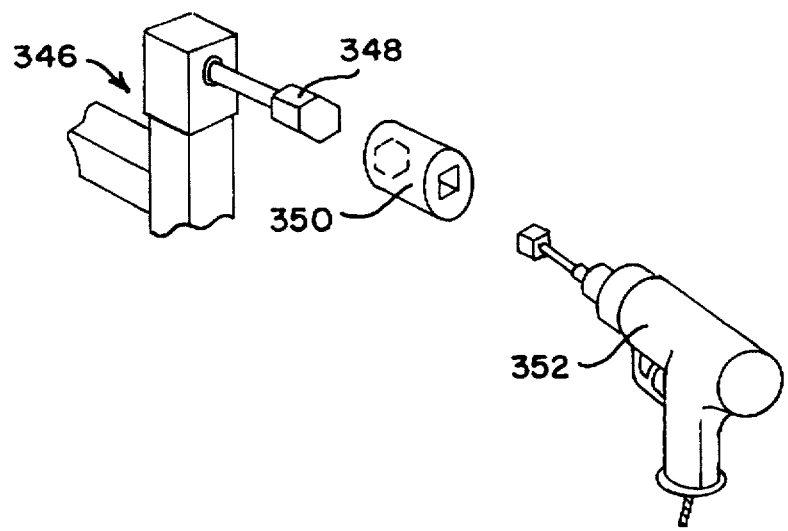
FIG. 22 is a perspective view of an alternate power source for the jacks.
Figure 23:
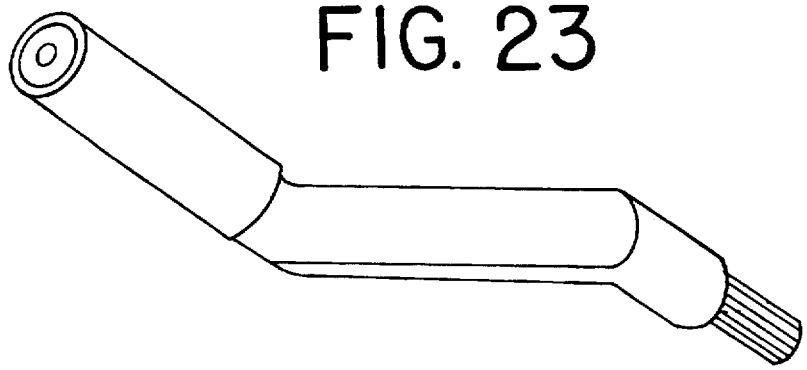
FIG. 23 is a perspective view of a manual crank that for the jacks.

In FIG. 22 another embodiment of the jack is illustrated. The jack 346 shown in FIG. 22 has an external hex shaped driven member 348 that will receive a standard socket 350. The socket 350 can be driven by a power tool 352 or by a manual crank 354. The manual crank 354 is shown in FIG. 23. The external hex shaped driven member 348 can be made longer than a standard bolt head to provide more driving surface area.

Figure 24:
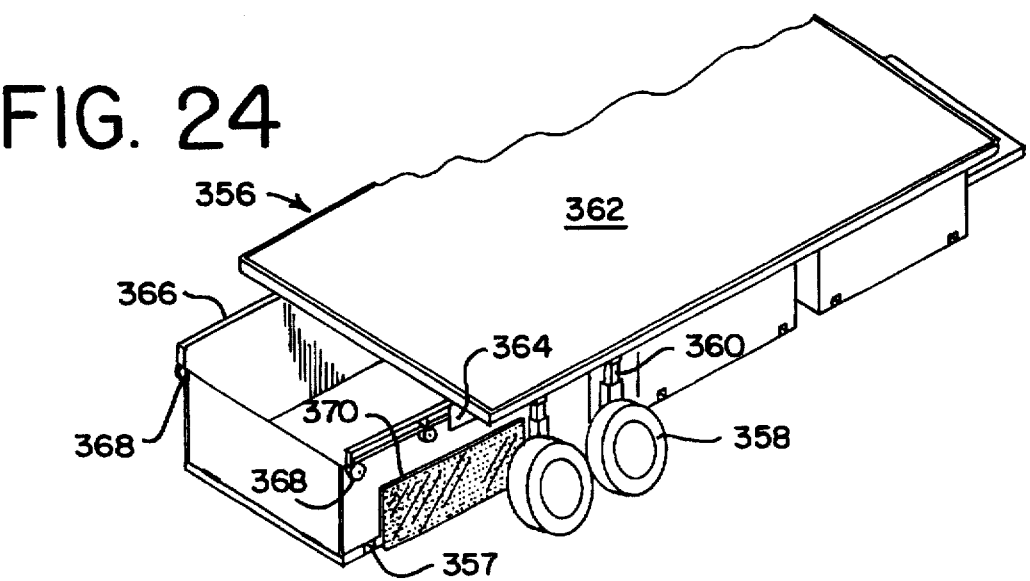
FIG. 24 is a perspective view of another embodiment of the roll on roll off system.
Figure 25:
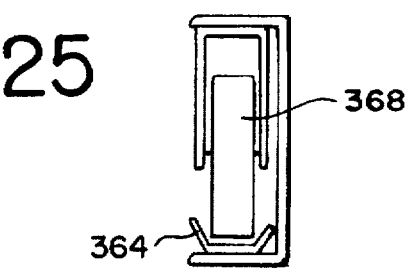
FIG. 25 is an enlarged view of a roller and track that can be used in the roll on roll off systems.

There is illustrated in FIG. 24 another embodiment of a wheeled vehicle and roll-on roll-off container or containers. In this view the wheeled vehicle 356 is of the type that is hitched to a tractor through a standard fifth wheel hitch. The wheels 358 are mounted to the frame of the wheeled vehicle 356 through suspensions 360 that include air or hydraulic adjusting mechanisms that can function to elevate or lower wheeled vehicle 356 relative to the ground. The wheeled vehicle 356 has a flatbed 362 that has a pair of parallel channels 364 secured to its undersurface. The container or containers 366 have two sets of rollers 368 secured along its sides. The rollers 368 are received in the channels 364 to thus provide an underslung roll-on roll-off arrangement between the wheeled vehicle 356 and the containers 366. It should be noted that in this embodiment a plurality of containers 366 can be supported by the wheeled vehicle 356. The containers 366 have sockets 357 for the reception of jacks 318. A swing gate 370 is pivotally connected to one suspension 360 and can be latched to the corresponding suspension 360 on the opposite side of the vehicle 356 during transport. The swing gate functions to prevent the containers 366 from rolling off the vehicle 356 during transport and stabilizes the vehicle wheels 358. FIG. 25 is an enlarged isolated view of one of the rollers 368 in rolling engagement within a channel 364.

Figure 26:
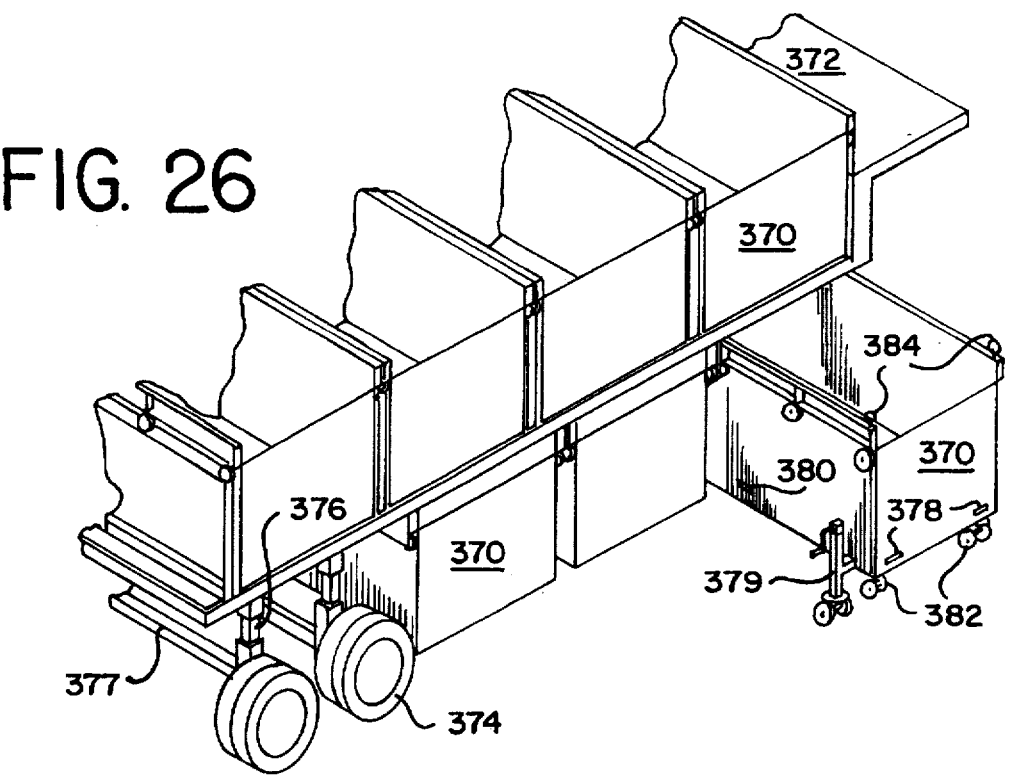
FIG. 26 is a perspective view of another embodiment of the roll on roll off system.

There is disclosed in FIG. 26 a roll-on roll-off system in which multiple containers 370 are carried by a single wheeled vehicle 372. The containers 370 roll on and off the wheeled vehicle in the lateral or transverse direction and can be loaded or unloaded from either side of the wheeled vehicle. The containers 370 and the supporting mechanism carried by the wheeled vehicle are modular which assures that any container can be supported at any location of the vehicle 372 or other wheeled vehicles to which they are unloaded. In this illustration an upper layer of containers are supported in the conventional top slung manner and a lower layer of containers are supported in an under slung manner. However, it should be noted that the wheeled vehicle could be designed to carry only a single layer of top slung containers or only a single layer of under slung containers. The wheeled vehicle 372 could be hitched to a highway tractor through a conventional fifth wheel hitch. The rear wheels 374 of the wheeled vehicle 372 can be secured to the vehicle through a conventional spring mounted mechanism or, as illustrated, the wheels 374 can be mounted to the frame of the wheeled vehicle 372 through suspensions 376 that include air or hydraulic adjusting mechanisms that can function to elevate or lower wheeled vehicle 372 relative to the ground. Axles 377 extend transversely of the vehicle to stabilized the wheels 374.

The containers 370, illustrated in FIG. 26, include sockets to receive portable jacks 379 that are secured to the container in the same two step procedure describe above. The container 370, illustrated in FIG. 26, that has been unloaded from the wheeled vehicle and is being supported on a plurality of jacks 379, has two sets of fork lift handling sockets 378 and 380 secured to its lower surface.

The set of fork lift handling sockets 378 can be engaged by the tongs of a fork lift when the container is fully contained on the wheeled vehicle 372. The container 370 also has a caster wheel 382 along the containers bottom surface at each corner. After the tongs are inserted into the sockets 378 the fork is lifted slightly and the fork lift vehicle is backed away from the wheeled vehicle 372. When the second set of jack receiving sockets are revealed, jacks 379 can be inserted into these sockets to support the other end of the container. The container can then either be supported on the ground by four jacks 379 or can be lowered and supported on the ground by the caster wheels 382.

The container 370 can also be picked up by a fork lift vehicle after inserting the tongs of the fork lift into the fork lift handling sockets 380. With the container 370 supported by a fork lift vehicle through sockets 380, the jacks 379 can be removed and the container lowered to the ground to be supported by the caster wheels 382 or the container can be transported to another location where it can be lowered to be supported again by the jacks 379.

The container 370 has a lifting pad eye ring 384 at each upper corner. A chain harness carried by an overhead crane can be connected to the eye rings 384 to enable the container to be maneuvered by the crane.

Figure 27:
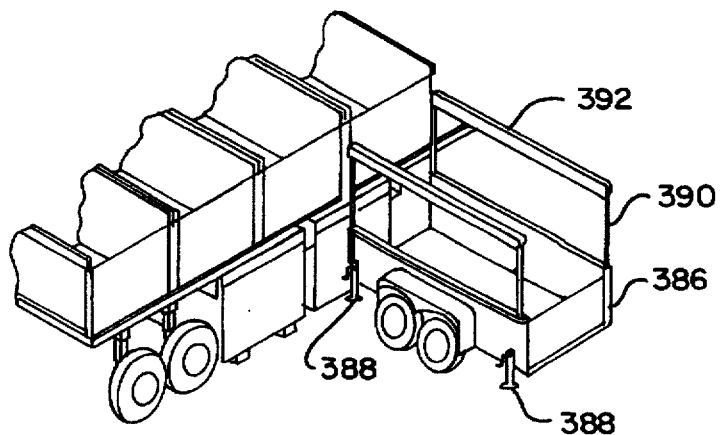
FIG. 27 is a perspective view of another embodiment of the roll on roll off system.

A small wheeled vehicle 386, of the type shown in FIG. 27 and of a size that can support one of the containers, can be used to unload a container 370 from the large wheeled vehicle 372. Jacks 388 are used to elevate, level and stabilize vehicle 386.

The upper layer of containers can be unloaded from the wheeled vehicle 372 in the same manner as the lower layer. Jacks having longer barrels will of course be required. Referring now to FIG. 27, when a small wheeled vehicle 386 is utilized they must be fitted with hydraulic jacks 390 that can raise horizontal support surfaces 392 to the level of the sets of wheels of the upper layer of containers. When the container is fully supported by the support surfaces 392, the hydraulic jacks 390 can be contracted.

Although the anti-friction roll-on roll-off mechanism generally permits one person to manually load and unload the containers, there are situations in which power means for assisting in this process are beneficial. Power assist would be appropriate when for example the load is very heavy or an individual must load and unload containers over a long time period.

Figure 28:
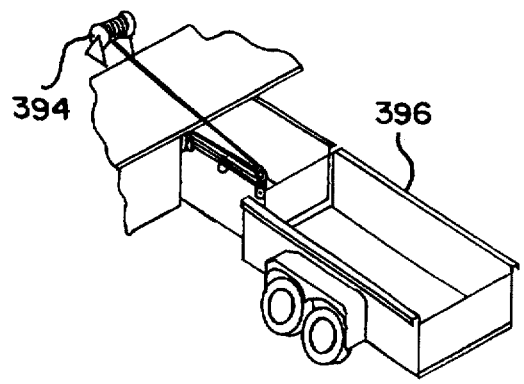
FIG. 28 is a perspective view of a roll on roll off system having a power device for controlling the container.

FIG. 28 discloses a power driven mechanism 394 that can be mounted on the wheeled vehicle. Power driven mechanism 394 functions to pull a container 396 from storage into a transport position on the wheeled vehicle. The power driven mechanism 394 could be a hand powered winch or an electric winch which uses cables or nylon straps.

Figure 29:
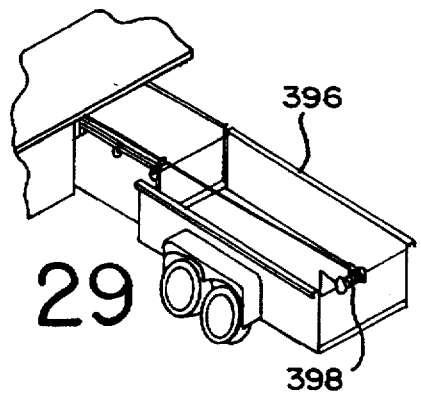
FIG. 29 is a perspective view of a roll on roll off system having another embodiment of the power device for controlling the container.

FIG. 29 discloses a power driven mechanism 398 that can be mounted on a wheeled vehicle upon which a container is to be loaded. The power driven mechanism 398 is illustrated as a hand winch however a electric winch or equivalent could be used for this purpose.

Figure 30:
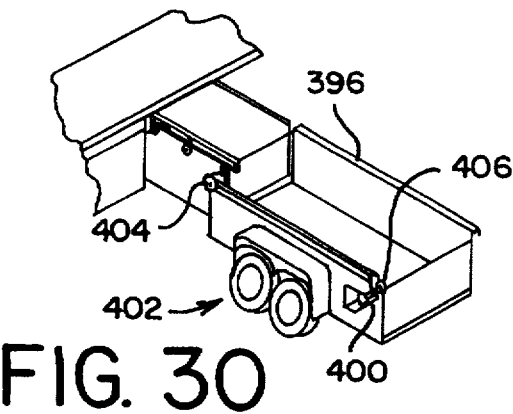
FIG. 30 is a perspective view of a roll on roll off system having still another embodiment of the power device for controlling the container.

FIG. 30 discloses power driven mechanism in the form of a winch combined with a pulley mechanism that will enable the winch to be used to both load and unload the roll on/off container. In a first mechanical arrangement the winch 400 is mounted on the closed end of a wheeled vehicle 402 with the cable extending toward the other end of the vehicle 402 where it is reversed over a sheave 404 and returns to the closed end of the vehicle 402. When the mechanism is used to pull a container onto the vehicle 402 the cable is reversed over a sheave 406 at the closed end of the vehicle and is then connected to the container. Upon actuation of the winch 400, winding in the cable, the container will be pulled into the vehicle 402. If it is desired to unload the container from vehicle 402, a second mechanical arrangement is utilized by releasing the cable from sheave 406 such that upon actuation of winch 400, winding in the cable, the container will be pulled off vehicle 402.

Figure 31:
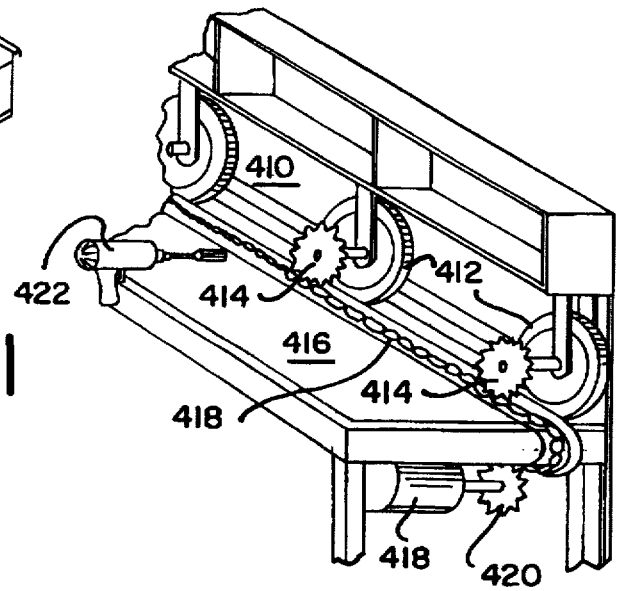
FIG. 31 is a perspective view of a portion of a wheeled vehicle and container on which is mounted another embodiment of the power device for controlling the container.

FIG. 31 illustrates another means for utilizing power sources for loading and unloading a roll-on roll-off container. In FIG. 31 the side 410 of the container having a set of rollers 412 mounted therealong is illustrated. A sprocket 414 is connected to each roller 412 for rotation therewith. An elongated flat surface 416 is secured to and extends horizontally along one upper edge of a wheeled vehicle. The container is supported by the wheeled vehicle through the sets of rollers 412 on the elongated flat surfaces 416. A continuous chain 418 is journaled such that its upper rung extends along the upper surface of elongated flat surface 416 and its lower rung extends along the lower surface of elongated flat surface 416. A power source 418, having a drive sprocket 420 in engagement with chain 418, is mounted on the lower surface of elongated flat surface 416. The power source 418 can be driven by hydraulics, air or electricity. When power source 418 is engaged, continuous chain 418 orbits around the elongated flat surface, causing sprockets 414 to rotate which in turn drives rollers 412. The power source 418 can drive in either direction to thus either load or unload the container.

The power source 418 shown in FIG. 31 could be eliminated and the continuous chain 418 secured stationary on the elongated flat surface 416. In this embodiment a hand held power tool 422 is connected through a driver to one of the sprockets 414 which causes the sprocket to advance along the chain 418 and carrying the container along with it. This power system, since it utilizes a portable hand held power source can be used for example to move the container along an assembly line in a manufacturing factory.

Figure 32:
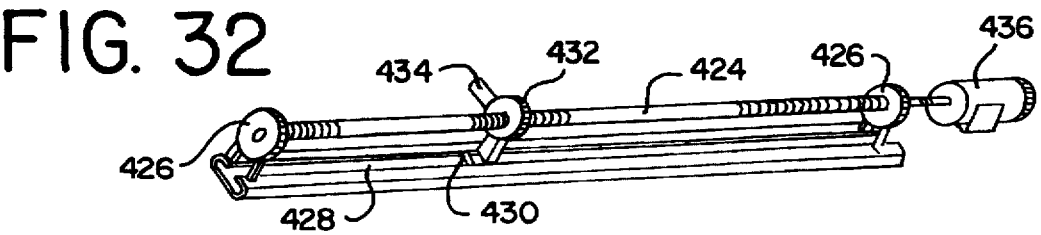
FIG. 32 is a perspective view of a power device for controlling the container that is isolated from the roll on roll off system.

FIG. 32 illustrates another means for utilizing a power driven mechanism for loading and unloading a roll-on roll-off container. In FIG. 32 an elongated threaded rod 424 is journaled at each end by journal blocks 426 that are mounted on the flat elongated surfaces of a container. The flat elongated surface has a slot 428 formed therein that slidingly receives a slide block 430. An internally threaded reciprocating driver 432 is secured to slide block 430. The elongated threaded rod 424 extends through the internal threads of reciprocating driver 432 such that as elongated threaded rod 424 is rotated the internally threaded member advances in one direction or the other along the rod. Internally threaded reciprocating driver 432 includes an integral connecting member 434 that can be connected to the container. A power driven mechanism 436 is connected to one end of elongated threaded rod 424 and when energized the threaded reciprocating driver 432 moves axially along the threaded rod 424. The threaded reciprocating driver 432 includes a protruding drive arm that is adapted to engage and lock to the container. The power driven mechanism 436 can be driven in either direction and thus can function to either load or unload the containers. The elongated threaded rod 424 and associated parts can be mounted on each of the flat elongated surfaces of the container.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A transport vehicle adapted to move in a longitudinal direction, independent supports borne by the ground, and a plurality of modular containers supported on said transport vehicle at predetermined elevations above the ground and movable from said transport vehicle, in a lateral direction, to said independent supports at said predetermined elevations above the ground;

said transport vehicle adapted to receive said modular containers from and unload said modular containers to said independent supports as a result of the modular containers being moved relative to the transport vehicle in a direction normal to the longitudinal direction of said transport vehicle; and each of said independent supports includes a plurality of jacks that are releasably attachable to said modular containers.

2. The invention as set forth in claim 1 in which said transport vehicle and containers have cooperating anti-friction mechanisms, that will support said containers on said transport vehicle to thereby provide a stable support for said containers during transport and to facilitate relative movement between a said container and said transport vehicle to a first position at which said transport vehicle is the sole support of said container and a number of said independent supports can be engaged to accept responsibility for a portion of the support for the container and then to a second position at which said transport vehicle supports a portion of the load of said container and a further number of said independent supports can be further engaged to accept responsibility for the remaining portion of the support for the container from the transport vehicle.

3. The invention as set forth in claim 1 in which each of said independent supports are independently movable from inoperative positions to operative positions at which they accept responsibility for a portion of the support of said modular containers.

4. The invention as set forth in claim 1 in which said jacks have ground engaging wheels.

5. The invention as set forth in claim 1 wherein each of said jacks include ground engaging jacking mechanisms that can adjust the height of said modular containers relative to the ground and raise said modular containers off said transport vehicle, such that said modular containers are ground supported, to thus permit movement of the transport vehicle away from said modular containers.

* * * * *